Figure 1:
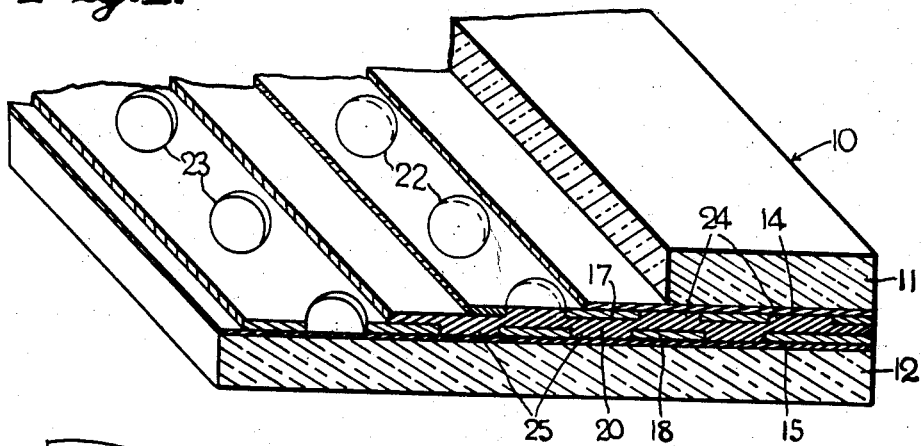

Nov. 25, 1941.  J. H. SHERTS ET AL  2,264,190
LAMINATED NONGLARE UNIT
Filed March 29, 1939

INVENTORS
JAMES HERVEY SHERTS
and ROBERT A. MILLER
BY
ATTORNEY

UNITED STATES PATENT OFFICE 2,264,190

LAMINATED NONGLARE UNIT

James Hervey Sherts, Pittsburgh, and Robert A. Miller, Tarentum, Pa., assignors to Pittsburgh Plate Glass Company, a corporation of Pennsylvania Application March 29, 1939, Serial No. 264,746

4 Claims. (Cl. 88—65)

This invention relates to non-glare, translucent sheets and it has particular relation to laminated, non-glare sheets for use in windshields for motor vehicles, vehicle headlight lenses, lenses for goggles, or other articles, wherein it is desirable to offset or obviate the glare of sunlight or artificial light.

One object of the invention is to provide an improved arrangement of laminated, translucent material in which several sheets having different physical characteristics are employed.

Another object of the invention is to provide an improved combination of translucent sheets, of which one or more of the latter is composed of light polarizing material.

Another object of the invention is to provide an improved method of assembling laminations of translucent materials.

In the assembly of sheets or layers of translucent material, especially for the formation of safety glass or the like, light polarizing media can be provided as a part of the layer or layers of the laminated structure. This light polarizing medium can be in the form of a thin sheet of cellulose plastic (either acetate or nitrate, or a mixture of these two materials) carrying crystals of herapathite, or its equivalent, dispersed through the plastic in such manner that the polarizing axes of the crystals are oriented in substantial parallelism.

Certain methods have heretofore been proposed to laminate a light polarizing sheet or layer in a multiple laminated plate. One arrangement of previously-known types of structure includes two outer sheets of glass, a sheet of cellulose nitrate or cellulose acetate cemented to the inner face of each sheet of glass and a polarizing sheet disposed between the cellulose sheets and cemented thereto. Firm surface bonding between the polarizing material and the other laminations involves difficult problems and great care must be exercised in order to avoid disturbing the orientation of the polarizing particles during the application of heat and pressure to the assembled layers.

One of the principal features of the present invention involves the use of two layers of polarizing material between which a layer of resinous material is disposed and on the outer surface of which additional layers of resinous material are secured. Each layer of polarized material is provided with a series of openings or slits and the openings of one layer are staggered with respect to the openings of the other layer. By the application of heat and pressure, the layers of resinous material between and on the outer sides of the layers of polarized material are bonded integrally through the several openings in the layers of polarized material.

Figure 2:
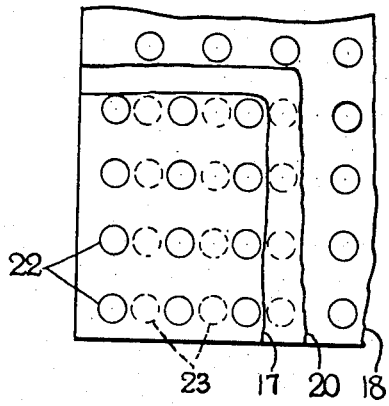
Figure 3:
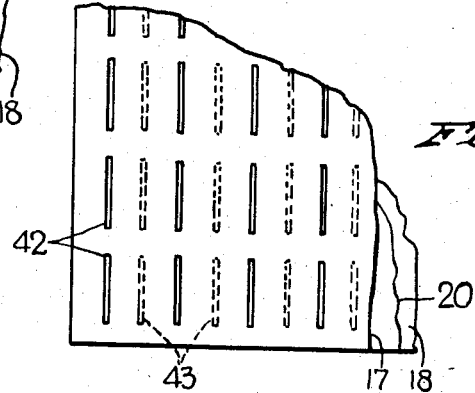

In the drawing:

Figure 1 is a fragmentary isometric view of a laminated unit, portions of which are shown in cross-section; Fig. 2 is a fragmentary plan of inner laminations of the structure shown in Fig. 1; Fig. 3 is a fragmentary plan similar to Fig. 2 and illustrating another type of laminations; and Fig. 4 is a fragmentary cross section of a laminated unit in which the type of laminations shown in Fig. 3 is employed.

One form of the invention is exemplified in the type of structure known as "safety glass" and shown as a laminated unit 10. There are provided outer glass plates 11 and 12 between which resinous layers 14 and 15 are disposed and the latter layers can be composed of vinyl acetal composition secured to the inner surfaces of the glass plates. Perforated layers 17 and 18 of light polarizing material are secured to the inner surfaces of the resinous layers 14 and 15, and an additional resinous layer 20 similar to layers 14 and 15 is secured between the perforated layers 17 and 18.

In assembling the elements of the unit 10, openings 22 formed in the polarizing layer 17 are staggered with respect to similar openings 23 formed in the polarizing layer 18. As a result of the application of heat and pressure, portions 24 and 25 of the resinous layers 14, 15 and 20 are pressed through the openings 22 and 23 and provide an integral bonding connection between these resinous layers. The openings in the layers 17 and 18 are not necessarily spaced as much as those shown and it is to be understood that the invention is applicable to various sizes and shapes of openings so long as openings of one layer 17 do not overlap the openings in the other layer 18.

Figure 4:
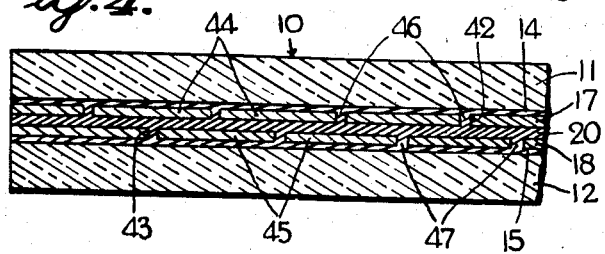

In the type of construction shown in Figs. 3 and 4, the layers 17 and 18 are provided with openings in the form of slits 42 and 43, the lines of which divide the layers into sections or areas 44 and 45, respectively, and these sections (Fig. 4) are arranged in staggered relation. As a result of the application of heat and pressure upon the unit, portions of the material of the resinous layers 14, 15 and 20 are pressed through the joints between adjacent sections of the polarizing layers, and so provide integral bonding connections 46 and 47 between these layers 14, 15 and 20.

One form of resin which has been found to be satisfactory for the layers 14, 15 and 20 is polymerized incomplete polyvinyl acetal, such as that described in the application of E. L. Fix, Serial No. 65,599, filed February 25, 1936. However, it is to be understood that other types of vinyl acetal resin compositions or cellulosic compositions can be employed. The resin can be plasticized with a glycol dihexoate as set forth in the application mentioned in an amount equal to approximately 30 per cent of the mix, or by one of the phthalates, such as diethyl phthalate, in an amount equal to approximately 37 per cent of the mix. An interlayer of these compositions has maximum strength under conditions of wide temperature ranges and the plasticizer will not adversely affect the orientation of the polarizing particles in the layers 17 and 18. These glycols are important in the production of an interlayer which will successfully withstand deterioration when the unit is subjected to heat and pressure in the laminating operation.

The polarizing layers 17 and 18 can be prefabricated and can be in the form of a body of cellulose acetate or cellulose nitrate with herapathite crystals dispersed therethrough with the crystal axes in substantial parallelism. This occurs in both of the polarizing layers.

Layers of this general composition are described in U. S. Patent No. 2,031,045, dated February 18, 1936. However, the present invention is not limited particularly to nitro-cellulose and an acetate non-solvent of herapathite as a plastic suspending medium for the polarizing particles according to the description in the patent, but it is to be understood that polarizing particles can be sustained or suspended in other cellulose plastic compositions.

Another method of disposing the polarizing material in an interlayer for insertion between sheets of glass, or for other uses, can be practiced by shredding or forming polarizing material into strips, or other forms of strands, and then dispersing the latter in a synthetic resinous or cellulosic plastic material. In forming the strands, the material is so cut or divided that the polarizing particles are oriented in substantial parallelism lengthwise of the strands. By extrusion, extension methods, or otherwise, the resinous or plastic material, throughout which the polarizing strands are dispersed, can be formed (e. g. in a flowing action) into layers or sheets of proper thickness, and during this operation the proper parallel orientation of the strands and polarizing particles is automatically effected. Likewise, integral bonding connections in the sheet are so disposed about the polarizing strands as to prevent separation of the latter. The strand carrying plastic provides a substantially continuous matrix and the complete unit is adapted to adhere to glass. The dispersion of strands in the plastic or resinous material and the formation of the finished sheet are such that the polarizing particles provide a complete polarizing screen in this sheet. That is, the strands abut or overlap, but the overlapping is not necessarily in the same plane.

Although only illustrative embodiments of the invention have been shown and described in detail, it will be apparent to those skilled in the art that the invention is not so limited but that various changes can be made therein without departing from the spirit of the invention or from the scope of the appended claims.

We claim:

1. A laminated construction comprising a pair of layers of light polarizing material, each layer having openings formed therethrough, the openings of one layer being staggered with respect to the openings of the other layer, layers of resinous material disposed between the pair of light polarizing layers and on the outer sides of the latter layers, said layers of resinous material having integral bonding connections extending through said openings.

2. A laminated polarizing unit comprising a pair of glass sheets, a layer of plasticized resinous substance adhered to the inner face of each glass sheet, a pair of layers of light polarizing material having particles with their polarizing axes oriented in substantial parallelism, each of the latter layers having openings formed therethrough, the openings in one layer being staggered with respect to the openings in the other layer and a layer of plasticized resinous substance disposed between the layers of light polarizing material, said layers of resinous substance having integral bonding connections extending through said openings.

3. A method of making a laminated polarizing unit which comprises forming openings through two layers of light polarizing material, laminating said layers with a stratum of resinous material therebetween and with the openings in one layer staggered with respect to the openings in the other layer, applying additional laminations on the outer surfaces of said layers and forming bonding connections through the openings between laminations on opposite sides of each layer of polarizing material by subjecting the assembled elements of the unit to heat and pressure.

4. A method of making a laminated polarizing unit which comprises forming openings through two layers of light polarizing material having axes of the polarizing particles oriented in substantial parallelism, assembling said layers with a stratum of resinous material therebetween and with the openings of one layer staggered with respect to the openings of the other, applying additional strata of resinous material on the outer sides of the layers and pressing and adhering sheets of glass on opposite sides of the assembled group of layers and strata under conditions of heat sufficient to form bonding connections between the resinous material on opposite sides of each layer, and through said openings.

JAMES HERVEY SHERTS.
ROBERT A. MILLER.